(12) United States Patent
Ikeya et al.

(10) Patent No.: US 10,260,462 B2
(45) Date of Patent: Apr. 16, 2019

(54) INTAKE DEVICE

(71) Applicant: HONDA MOTOR CO., LTD., Tokyo (JP)

(72) Inventors: Kenichiro Ikeya, Wako (JP); Naohiro Ishikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/308,416

(22) PCT Filed: Mar. 24, 2015

(86) PCT No.: PCT/JP2015/001661
§ 371 (c)(1),
(2) Date: Nov. 2, 2016

(87) PCT Pub. No.: WO2016/002112
PCT Pub. Date: Jan. 7, 2016

(65) Prior Publication Data
US 2017/0122271 A1 May 4, 2017

(30) Foreign Application Priority Data
Jul. 1, 2014 (JP) .................................. 2014-135519

(51) Int. Cl.
*F02M 35/10* (2006.01)
*F02M 35/112* (2006.01)
(Continued)

(52) U.S. Cl.
CPC .......... *F02M 35/112* (2013.01); *F02M 35/10* (2013.01); *F02M 35/1045* (2013.01);
(Continued)

(58) Field of Classification Search
CPC ............ F02B 27/005; F02M 35/10072; F02M 35/112; F02M 35/104; F02M 35/10032;
(Continued)

(56) References Cited

U.S. PATENT DOCUMENTS 3,024,774 A * 3/1962 Eby, Jr. ............ F02M 35/10072
123/184.39
4,664,075 A * 5/1987 Poulos ............. F02M 35/10052
123/184.42
(Continued)

FOREIGN PATENT DOCUMENTS

DE 3728179 A1 3/1989
JP S57101367 U 6/1982
(Continued)

OTHER PUBLICATIONS

International Search Report for International Application No. PCT/JP2015/001661, dated Jun. 23, 2015, 4 pages.

*Primary Examiner* — Kevin A Lathers
(74) *Attorney, Agent, or Firm* — Armstrong Teasdale LLP

(57) ABSTRACT

In an intake device for an internal combustion engine, a difference in the air-fuel ratio between the cylinders is reduced without increasing the lengths of the branch passages. An intake device (23) for an internal combustion engine (1) having at least three cylinders (3) includes: an intake chamber (30) configured to be connected with an air inlet (16); and multiple branch passages (31) connected at upstream ends (41) thereof to the intake chamber and connected at downstream ends thereof to intake ports (6) communicating with the cylinders, respectively, wherein the upstream ends of the branch passages are arranged in a direction of rotation about a predetermined center line X in a same order as an order of ignition of the cylinders.

16 Claims, 13 Drawing Sheets

(51) Int. Cl.
*F02P 15/08* (2006.01)
*F02M 35/104* (2006.01)
*F02P 5/00* (2006.01)

(52) U.S. Cl.
CPC ............................ *F02M 35/10072* (2013.01); *F02M 35/10124* (2013.01); *F02M 35/10157* (2013.01); *F02P 15/08* (2013.01); *F02P 5/00* (2013.01); *Y02T 10/144* (2013.01)

(58) Field of Classification Search
CPC ........ F02M 35/10052; F02M 35/10091; F02P 15/08
See application file for complete search history.

(56) References Cited

U.S. PATENT DOCUMENTS

| | | | | |
|---|---|---|---|---|
| 4,765,285 A * | 8/1988 | Kobayashi | ............ | F02B 27/02 123/184.49 |
| 5,074,258 A * | 12/1991 | Hitomi | ............ | F02B 27/00 123/184.38 |
| 5,947,483 A * | 9/1999 | Brummer | ............ | F16J 15/106 277/591 |
| 7,640,908 B2 * | 1/2010 | Wessels | ............ | F02M 35/10052 123/184.21 |
| 2003/0221651 A1 * | 12/2003 | Ito | ............ | F02M 35/10078 123/184.61 |
| 2013/0160736 A1 * | 6/2013 | Matsuzaki | ............ | F02D 9/1075 123/337 |

FOREIGN PATENT DOCUMENTS

| | | |
|---|---|---|
| JP | S63170568 U | 11/1988 |
| JP | H01208511 A | 8/1989 |
| JP | H0392533 A | 4/1991 |
| JP | H04136420 A | 5/1992 |
| JP | H0484756 U | 7/1992 |
| JP | 2008501082 A | 1/2008 |

* cited by examiner

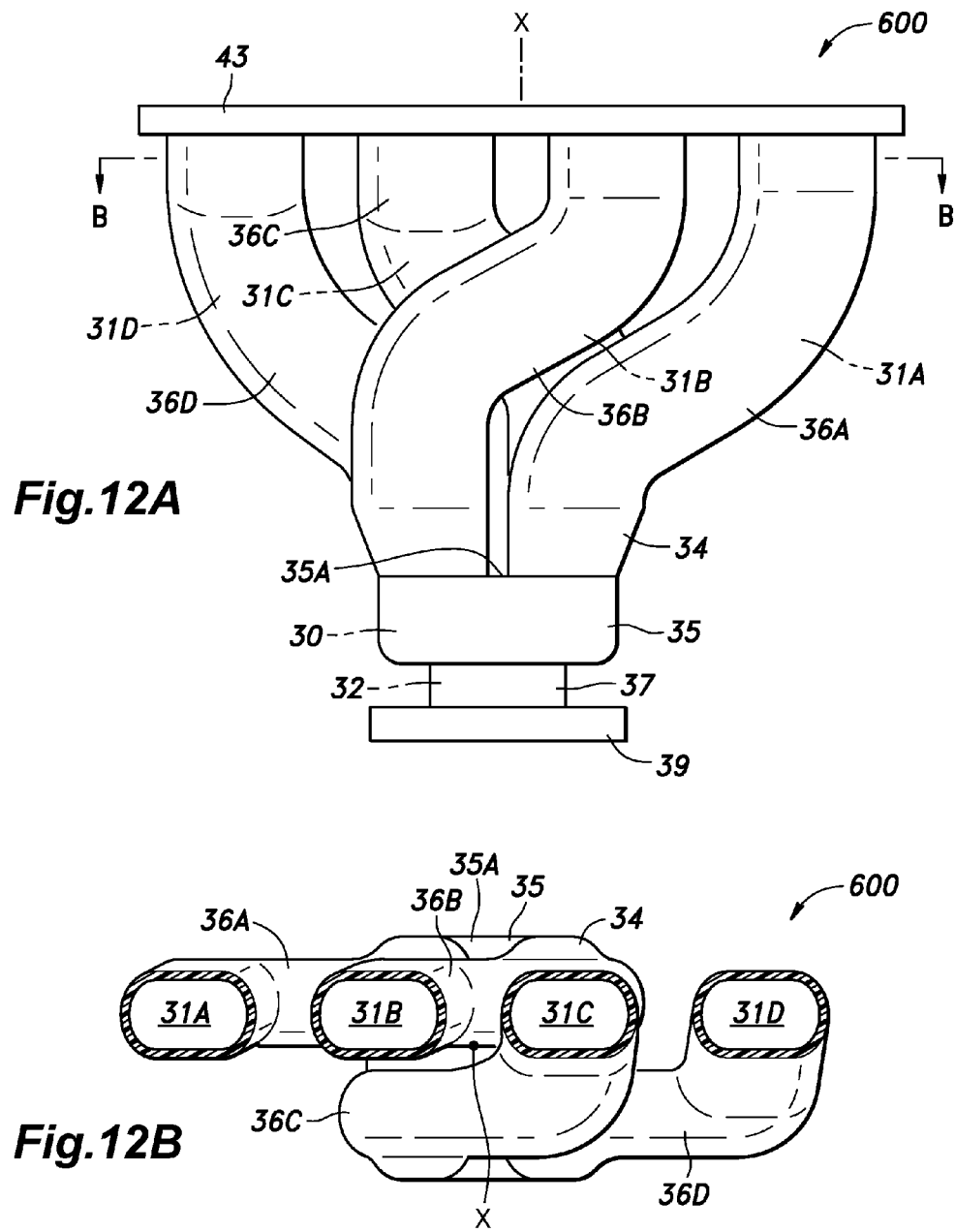

INTAKE DEVICE

TECHNICAL FIELD

The present invention relates to an intake device for an internal combustion engine.

BACKGROUND ART

In an intake system for a multi-cylinder internal combustion engine, an intake device (intake manifold) including an intake chamber connected to an air inlet and a plurality of branch passages that branch off from the intake chamber in correspondence to the intake ports of the respective cylinders is used. In such an intake device, it is often the case that the branch passages are arranged in line with each other in a manner similar to the arrangement of the cylinders, and are connected with the intake chamber in a row. However, in such an intake device, a branch passage disposed at an end portion in the direction of the arrangement and a branch passage disposed at a central portion have different positional relationships with the other branch passages, and this may cause a difference between the amounts of air taken in the cylinders, which in turn may result in a difference in the air-fuel ratio. To address this problem, in some intake devices, the branch passages are connected at positions rotationally symmetric about a predetermined center line of the intake chamber such that the relative positions of the branch passages are the same (symmetric) (e.g., Patent Documents 1-3).

PRIOR ART DOCUMENT(S)

Patent Document(s)

[Patent Document 1] JPH01-208511A
[Patent Document 2] JPH03-92533A
[Patent Document 3] JPH04-84756U

BRIEF SUMMARY OF THE INVENTION

Task to be Accomplished by the Invention

However, in the cylinder connected to each branch passage, an influence imparted to each branch passage changes depending on the strokes of the combustion cycle. Further, in accordance with the order of ignition, predetermined phase differences are set to the combustion cycles of the cylinders, and therefore, the strokes of the cylinders at an arbitrary time point are usually different from each other. Consequently, the characteristics of the branch passages connected to the respective cylinders are different from each other at an arbitrary time point. Therefore, even if the connecting parts of the branch passages with the intake chamber are arranged at positions symmetric to each other, a difference may be caused in the influence received by one branch passage from another. This influence is particularly large in an internal combustion engine using an Atkinson cycle.

The Atkinson cycle is realized as a Miller cycle in that the closing timing of the intake valve is delayed relative to the bottom dead center to reduce the effective compression ratio. In this case, when one cylinder is in the intake stroke (the intake valve is open and the piston moves downward), another cylinder is in the blow-back stroke (the intake valve is open and the piston moves upward), whereby gas is returned from the cylinder in the blow-back stroke to the intake device, and a part of the gas may flow to the cylinder in the intake stroke. In cases such as when the fuel injection is performed in the intake port or when in the intake stroke the fuel is injected directly into the cylinder, the air-fuel mixture including the fuel flows to the cylinder in the intake stroke from the cylinder in the blow-back stroke via the intake device, causing a fluctuation in the air-fuel ratio. Particularly, in the case where the fuel injection is performed in the intake port, the fuel adhering to the intake port flows to another cylinder by being carried on the blow-back flow, and therefore, the fluctuation in the air-fuel ratio becomes even larger.

The cylinder in the blow-back stroke and the cylinder in the intake stroke are each switched depending on the crank angle, and therefore, the distance between the upstream end of the branch passage corresponding to the cylinder in the blow-back stroke and the upstream end of the branch passage corresponding to the cylinder in the intake stroke changes in accordance with the arrangement of the upstream ends. As a result, the amount of air-fuel mixture flowing in the cylinder in the intake stroke due to the blow-back varies for different cylinders, and this causes a difference between the air-fuel ratios for the respective cylinders. To suppress such a difference in the air-fuel ratio, there is a technique that increases the volumes of the branch passages (increases the lengths of the branch passages) such that the blown-back air-fuel mixture does not reach the cylinder in the intake stroke. However, as the volumes of the branch passages increase, the time period from an operation of the throttle valve or the turbocharger, which are positioned on an upstream side of the intake device, until an effect thereof appears as a change in the air intake quantity becomes longer. Namely, the responsiveness of the required air quantity and/or the required reflux gas quantity determined from required operating conditions deteriorates. In addition, there is a problem that the intake device tends to be larger.

In view of the foregoing background art, an object of the present invention is to reduce, in an intake device for an internal combustion engine, the difference in the air-fuel ratio between the cylinders, without increasing the size of the branch passages.

Means to Accomplish the Task

To achieve the above object, the present invention provides an intake device (23) for an internal combustion engine (1) having at least three cylinders (3), the intake device comprising: an intake chamber (30) configured to be connected to an air inlet (16); and a plurality of branch passages (31) connected at upstream ends (41) thereof to the intake chamber and connected at downstream ends thereof to intake ports (6) communicating with the cylinders, respectively, wherein the upstream ends of the branch passages are arranged in a direction of rotation about a predetermined center line (X) in a same order as an order of ignition of the cylinders.

According to this configuration, around the branch passage corresponding to the cylinder in the intake stroke, the branch passages corresponding to the cylinders in respective strokes are always arranged at the same relative positions. For example, in a case where the internal combustion engine operates in Atkinson cycle, the upstream end of the branch passage corresponding to the cylinder in the blow-back stroke and the upstream end of the branch passage corresponding to the cylinder in the intake stroke are always adjacent to each other in the direction of rotation about the center line, whereby the distance is substantially constant.

Therefore, the influence that the cylinder in the intake stroke receives from the blow-back is equal for each cylinder, and the difference between the air-fuel ratios for the respective cylinders is reduced. Thereby, the difference between the air-fuel ratios for the respective cylinders is reduced without increasing the size of the branch passages.

In the foregoing invention, preferably, a total length of the branch passage and intake port is set to be equal for each of the cylinders.

According to this configuration, in the case where the internal combustion engine operates in Atkinson cycle, the distance from the cylinder in the blow-back stroke to the cylinder in the intake stroke, via the intake port, branch passage, intake chamber, branch passage, and intake port, is equal for each cylinder, and the difference between the air-fuel ratios for the respective cylinders is reduced.

In the foregoing invention, preferably, lengths of the branch passages are set to be equal to each other.

According to this configuration, the intake ports can have the same shape and length with each other, and thus, the structure can be simplified.

In the foregoing invention, preferably, the cylinders include first to fourth cylinders (3A-3D) arranged along a predetermined cylinder row direction, where the order of ignition is first, third, fourth, and second cylinder or first, second, fourth, and third cylinder; the center line is positioned on a plane perpendicular to the cylinder row direction to pass through a part between the second and third cylinders; the upstream end of the branch passage (31A) corresponding to the first cylinder is located on a first cylinder side with respect to the center line in the cylinder row direction; the upstream end of the branch passage (31D) corresponding to the fourth cylinder is located on a fourth cylinder side with respect to the center line in the cylinder row direction; the upstream end of the branch passage (31B, 31C) corresponding to one of the second and third cylinders is located on one side with respect to the center line in a first direction that is perpendicular to the cylinder row direction and the center line; and the upstream end of the branch passage corresponding to the other of the second and third cylinders is located on the other side with respect to the center line in the first direction.

According to this configuration, it is possible to make the intake device compact while arranging the upstream ends of the branch passages in the direction of rotation about the center line in the same order as the order of ignition of the cylinders.

In the foregoing invention, preferably, the upstream ends of the branch passages corresponding to the first and fourth cylinders are formed to have a transverse cross section in an elliptic shape having a length in the first direction larger than a length in the cylinder row direction.

The branch passages corresponding to the first and fourth cylinders shift toward the center side in the cylinder row direction as they extend from the ends thereof on the intake port side to the upstream ends. As a result, a blow-back flow passing through the transverse cross section of each branch passage has a reduced velocity (density) on a center side in the cylinder row direction and an increased velocity (density) on an outer side in the cylinder row direction. The branch passages corresponding to the second and third cylinders also shift toward the center side in the cylinder row direction as they extend from the ends thereof on the intake port side to the upstream ends, but their lengths in the cylinder row direction are shorter than those of the branch passages corresponding to the first and fourth cylinders. Therefore, there is a difference between the blow-back flow distribution in the upstream ends of the branch passages corresponding to the first and fourth cylinders and the blow-back flow distribution in the upstream ends of the branch passages corresponding to the second and third cylinders. As a result, a difference is created between the influences imparted by the blow-back flow to the intake air for the respective cylinders. According to the foregoing configuration, because the branch passages corresponding to the first and fourth cylinders have a reduced width in the cylinder row direction, the difference in the blow-back flow distribution in the cylinder row direction is reduced. Thereby, the difference in the velocity distribution of the blow-back flow in the transverse cross section of the upstream ends of the branch passages corresponding to the first and fourth cylinders is suppressed, and the difference between the influences imparted by the blow-back flow to the intake air for the respective cylinders is reduced.

In the foregoing invention, preferably, the upstream end of the branch passage corresponding to the second cylinder is offset relative to the center line in the cylinder row direction toward the branch passage corresponding to the cylinder in which ignition is performed immediately before ignition in the second cylinder, and the upstream end of the branch passage corresponding to the third cylinder is offset relative to the center line in the cylinder row direction toward the branch passage corresponding to the cylinder in which ignition is performed immediately before ignition in the third cylinder.

The intake ports corresponding to the first and fourth cylinders are arranged at positions more distant from the center line than the intake ports corresponding to the second and third cylinders, and therefore, the branch passages corresponding to the first and fourth cylinders form flow paths more curved than those formed by the branch passages corresponding to the second and third cylinders, and hence, result in a larger flow resistance. As a result, the blow-back flow passing through the branch passages corresponding to the first and fourth cylinders tends to be weaker than the blow-back flow passing through the branch passages corresponding to the second and third cylinders. With the foregoing configuration, the blow-back flow passing through the branch passages corresponding to the first and fourth cylinders is allowed to flow easily to the branch passages of the second and third cylinders in the intake stroke, and the difference between the influences imparted by the blow-back flow to the intake air for the respective cylinders is reduced.

In the foregoing invention, preferably, a first barrier (401) for suppressing a flow of gas is provided to protrude from a part of an inner surface of a housing forming the intake chamber between the upstream end of the branch passage corresponding to the first cylinder and the upstream end of the branch passage corresponding to the cylinder in which ignition is performed immediately before ignition in the first cylinder, and a second barrier (402) for suppressing a flow of gas is provided to protrude from a part of the inner surface of the housing forming the intake chamber between the upstream end of the branch passage corresponding to the fourth cylinder and the upstream end of the branch passage corresponding to the cylinder in which ignition is performed immediately before ignition in the fourth cylinder.

According to this configuration, it becomes difficult for the blow-back flow passing through the branch passages corresponding to the second and third cylinders to flow to the branch passages corresponding to the first and fourth cylinders in the intake stroke, and the difference between the influences imparted by the blow-back flow to the intake air for the respective cylinders is reduced.

In the foregoing invention, preferably, a part of an inner surface of a housing forming the intake chamber between the upstream end of the branch passage corresponding to the first cylinder and the upstream end of the branch passage corresponding to the cylinder in which ignition is performed immediately before ignition in the first cylinder is connected by a first curved surface portion (501) that is smooth to facilitate a flow of gas, and a part of the inner surface of the housing forming the intake chamber between the upstream end of the branch passage corresponding to the fourth cylinder and the upstream end of the branch passage corresponding to the cylinder in which ignition is performed immediately before ignition in the fourth cylinder is connected by a second curved surface portion (502) that is smooth to facilitate a flow of gas.

According to this configuration, it becomes easy for the blow-back flow passing through the branch passages corresponding to the first and fourth cylinders to flow to the branch passages corresponding to the second and third cylinders in the intake stroke, and the difference between the influences imparted by the blow-back flow to the intake air for the respective cylinders is reduced.

In the foregoing invention, preferably, the intake device comprises: a chamber forming member (35) forming the intake chamber; a plurality of passage forming members (36A-36D) forming the branch passages, respectively; and a connecting wall (701) connecting an outer surface of the chamber forming member and outer surfaces of the passage forming members to each other such that a space defined between the outer surfaces of the chamber forming member and the passage forming members constitutes an inner chamber (702) closed to an outside, wherein the inner chamber is in communication with the intake chamber.

According to this configuration, the outer shape of the intake device is simplified and thus can be formed easily. In a case where the chamber forming member and the plurality of branch passages have overlapping portions when the intake device is viewed from outside in an arbitrary direction and a space is present between the overlapping portions, the structure of a molding die needs to be complex. According to this configuration, because the chamber forming member and plurality of branch passages are connected with each other by the connecting wall such that the outer shape is simplified, it is possible to form the intake device by molding using a two-piece die, for example. Because the inner chamber surrounded by the connecting wall is in communication with the intake chamber, it can be formed with the inner surface of the intake chamber.

Effect of the Invention

According to the foregoing configuration, it is possible to reduce, in an intake device for an internal combustion engine, the difference in the air-fuel ratio between the cylinders, without increasing the size of the branch passages.

BRIEF DESCRIPTION OF THE DRAWINGS

FIG. 12A is a plan view of an intake device according to a sixth embodiment, FIG. 12B is a cross-sectional view taken along line B-B in FIG. 12A.

EMBODIMENTS FOR CARRYING OUT THE INVENTION

In the following, detailed description will be made of the present invention with reference to the drawings in terms of embodiments in which the present invention is applied to an internal combustion engine of an automobile.

Figure 1:
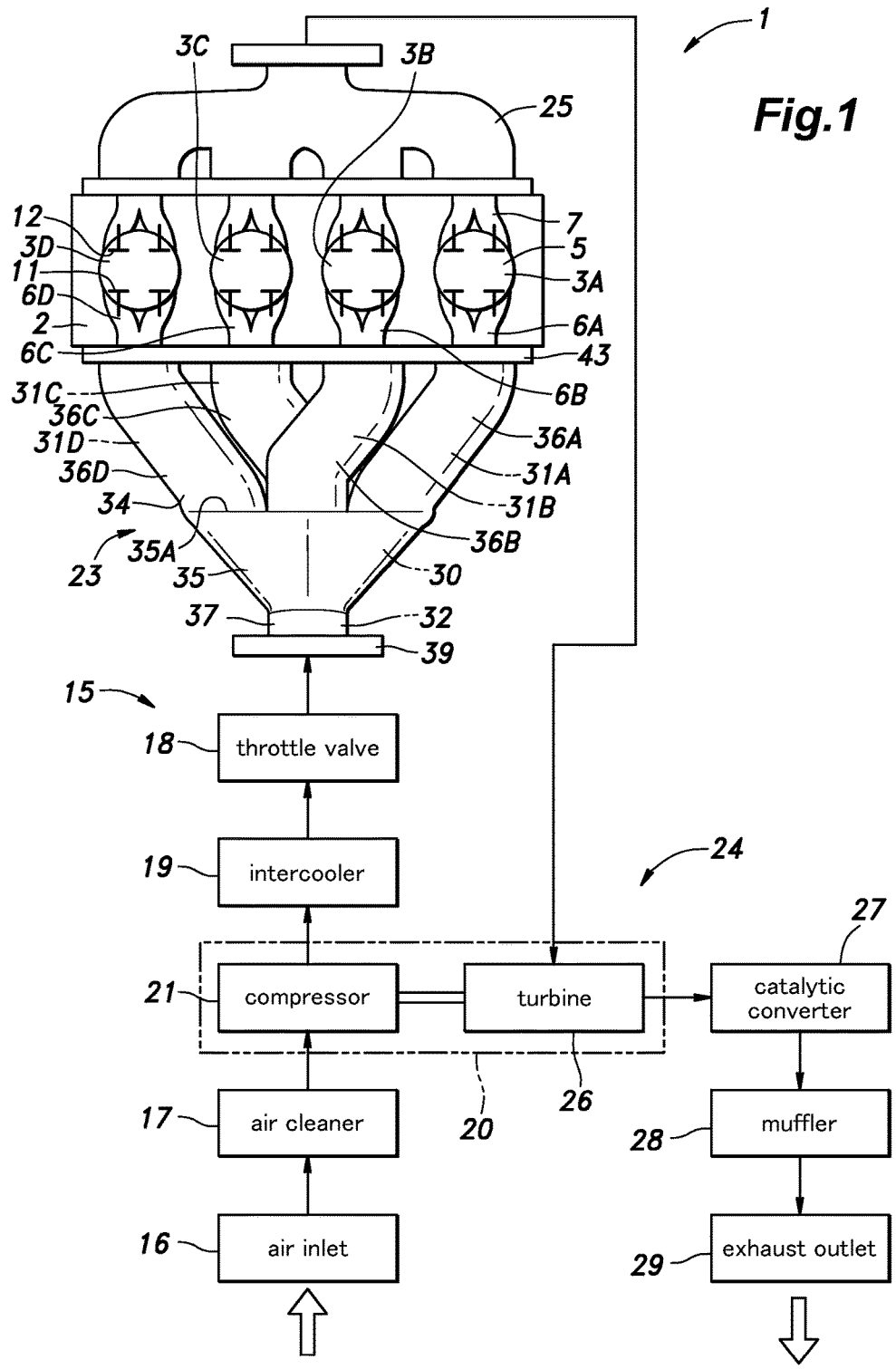
FIG. 1 is a schematic diagram of an internal combustion engine equipped with an intake device according to a first embodiment.
Figure 2:
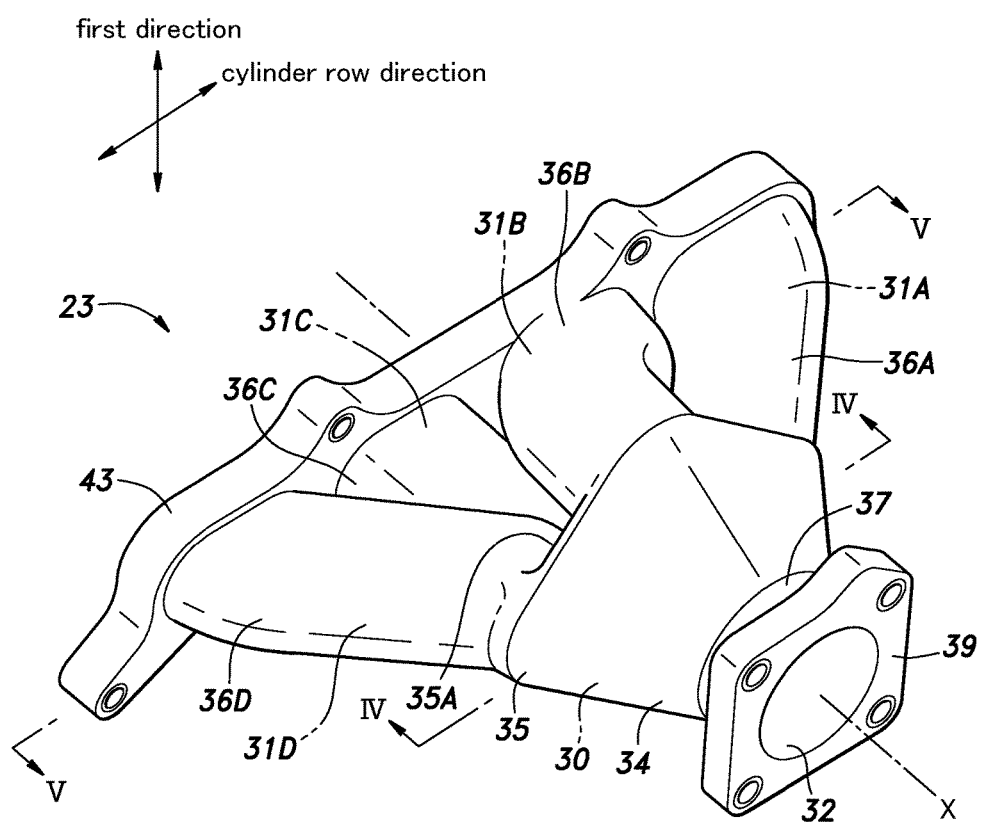
FIG. 2 is a perspective view of the intake device of the first embodiment.
Figure 3:
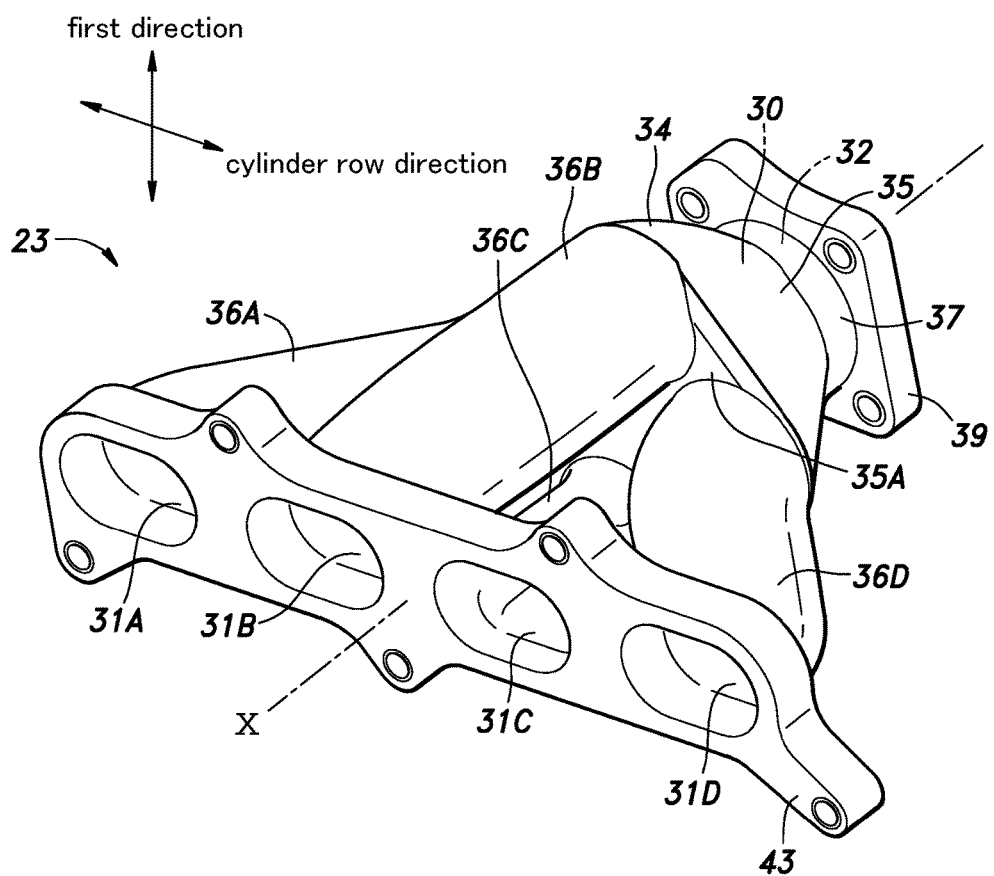
FIG. 3 is a perspective view of the intake device of the first embodiment.

An internal combustion engine 1 according to the present embodiment is a four-stroke, in-line four-cylinder reciprocating engine. As shown in FIG. 1, an engine body 2, which is a main body of the internal combustion engine 1, is formed by assembling a cylinder block, a cylinder head, an oil pan, a head cover, etc. The engine body 2 has four cylinders 3 (first to fourth cylinders 3A, 3B, 3C, 3D) formed therein. The four cylinders 3 arranged in line such that their axes (cylinder axes) are parallel to each other and reside in a single hypothetical plane. The direction of arrangement of the cylinders 3A-3D will be referred to as a cylinder row direction. The four cylinders 3 will be referred to, in order from one side in the cylinder row direction (left side in FIG. 1) to the other, as a first cylinder 3A, a second cylinder 3B, a third cylinder 3C, and a fourth cylinder 3D. In the following, for the sake of convenience of explanation, description will be made with an assumption that the cylinder row direction is a fore-and-aft direction and a direction perpendicular to the cylinder row direction and the cylinder axis direction is a lateral direction.

A piston (not shown in the drawings) is reciprocatably received in each cylinder 3A-3D and a combustion chamber 5 is defined between the top surface of the piston and an end of each cylinder 3. Each combustion chamber 5 communicates with an intake port 6 and an exhaust port 7. The intake port 6 extends from each combustion chamber 5 to one of the side surfaces of the engine body 2 in the lateral direction that is perpendicular to the cylinder row direction and the cylinder axis direction and opens out in the one side surface, while the exhaust port 7 extends from each combustion chamber 5 to the other of the side surfaces of the engine body 2 in the lateral direction and opens out in the other side surface. Each of the intake port 6 and the exhaust port 7 has an outer end portion which opens out in the side surface of the engine body 2 and a pair of bifurcating inner end portions which are each in communication with the combustion chamber 5. The outer end portion of each of the intake port 6 and the exhaust port 7 extends substantially in parallel with the lateral direction. In the following description, the structural elements (such as the intake port 6) associated with the first cylinder 3A will be denoted by numerals suffixed with "A," the structural elements associated with the second cylinder 3B will be denoted by numerals suffixed with "B," the structural elements associated with the third cylinder 3C will be denoted by numerals suffixed with "C," and the structural elements associated with the fourth cylinder 3D will be denoted by numerals suffixed with "D."

The first to fourth intake ports 6A-6D are formed to have the same length and volume. The length of each of the first to fourth intake ports 6A-6D is a distance from the inner end that is connected to the combustion chamber 5 to the outer end that opens out in the side surface of the engine body 2.

At the boundary between the combustion chamber 5 and each of the inner end portions of the intake port 6 is provided an intake valve 11, and at the boundary between the combustion chamber 5 and each of the inner end portions of the exhaust port 7 is provided an exhaust valve 12. The intake valve 11 and the exhaust valve 12 each consist of a known poppet valve, and are operated to switch the communicating state between each port 6, 7 and the combustion chamber 5 between open and closed states.

In the internal combustion engine 1 of this embodiment, the piston received in the first cylinder 3A and the piston received in the fourth cylinder 3D are in the same phase, while the pistons received in the first cylinder 3A and the second cylinder 3B have a phase difference of 180 degrees relative to the piston received in the first cylinder 3A. The order of ignition is the first cylinder 3A (0 degree), the third cylinder 3C (180 degrees), the fourth cylinder 3D (360 degrees), and the second cylinder 3B (540 degrees).

An intake system 15 of the internal combustion engine 1 includes, in order from the upstream side, an air inlet 16, an air cleaner 17, a compressor 21 of a turbocharger 20, an intercooler 19 that serves as a cooling device for cooling the intake air, a throttle valve 18, an intake device 23 (intake manifold), and the intake ports 6. Each intake port 6 is provided with a fuel injection device not shown in the drawings. Air is taken in from the air inlet 16, and passes through the air cleaner 17 to remove foreign matters therefrom. Thereafter, the flow rate of the air is regulated by the throttle valve 18, and the air is compressed by the compressor 21. The air output from the compressor 21 is distributed by the intake device 23 to each intake port 6, and, in the intake port 6, is supplied with a fuel from the fuel injection device, such that air-fuel mixture is made. The air-fuel mixture flows to the combustion chamber 5 through the intake valve 11, and is combusted at a predetermined timing.

An exhaust system 24 of the internal combustion engine 1 includes, in order from the upstream side, the exhaust ports 7, an exhaust manifold 25, a turbine 26 of the turbocharger 20, a catalytic converter 27, a muffler 28, and an exhaust outlet 29. The exhaust gas generated as a result of combustion in each combustion chamber 5 is collected in the exhaust manifold 25, and, after a part of the energy thereof is recovered by the turbine 26, is purified by the catalytic converter 27. Thereafter, the exhaust gas passes through the muffler 28 and is discharged to the outside from the exhaust outlet 29.

As shown in FIGS. 1 to 5, the intake device 23 includes an intake chamber 30 disposed on an upstream side, and first to fourth branch passages 31A-31D extending from the intake chamber 30 in a downstream direction. An upstream portion of the intake chamber 30 is in communication with an introduction passage 32. The first branch passage 31A is in communication with a first intake port 6A corresponding to the first cylinder 3A. The branch passages 31B-31D of the other numbers also are in communication with the intake ports 6B-6D of the cylinders 3B-3D, respectively.

The introduction passage 32, the intake chamber 30, and the first to fourth branch passages 31A-31D are formed in a housing 34 constituting an outer shell. The housing 34 includes a chamber portion 35 forming the intake chamber 30, four branch passage portions 36A-36D protruding from the chamber portion 35 and forming the branch passages 31A-31D, and an introduction passage portion 37 protruding from the chamber portion 35 and forming the introduction passage 32. The housing 34 is formed by molding resin, for example.

The chamber portion 35 is formed in a shape of a rectangular pyramid having a rectangular bottom plate 35A. The introduction passage portion 37 is connected to the top portion of the chamber portion 35 opposite to the bottom plate 35A. Around the outer periphery of the upstream end of the introduction passage portion 37 is formed an upstream-side flange 39. The upstream-side flange 39 is connected directly with a housing of the throttle valve 18 or connected with a pipe that is connected with the housing of the throttle valve 18.

Figure 4:
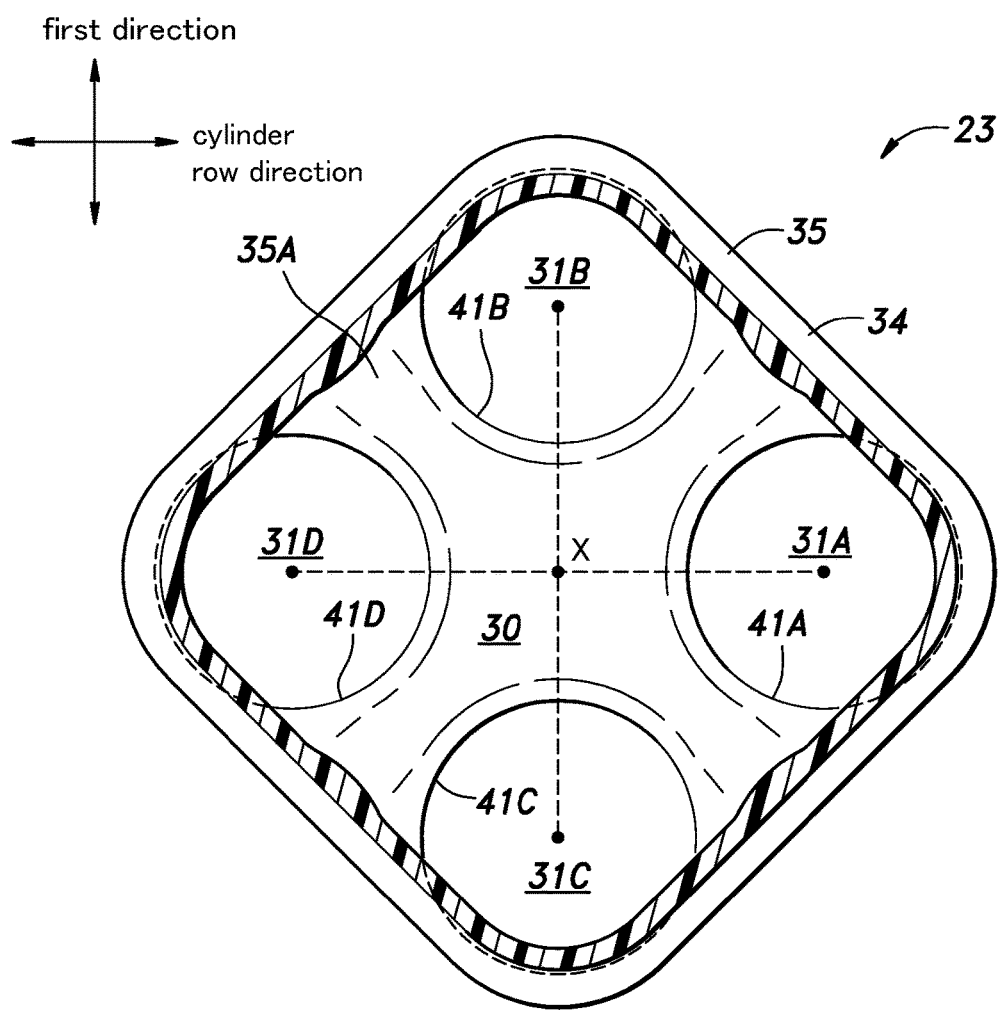
FIG. 4 is a cross-sectional view taken along line IV-IV in FIG. 2.
Figure 5:
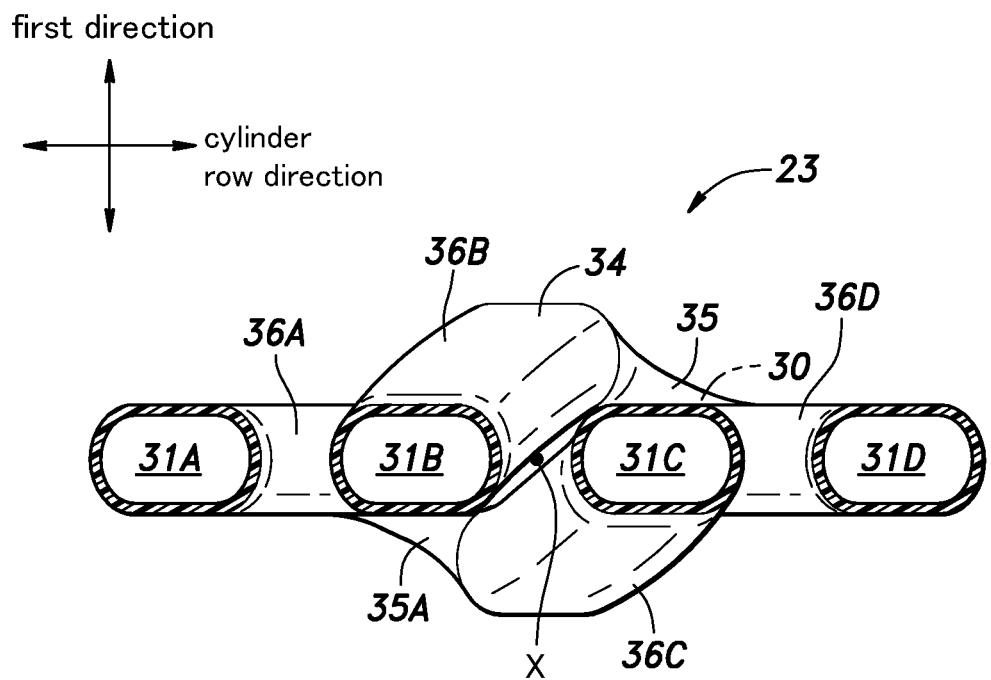
FIG. 5 is a cross-sectional view taken along line V-V in FIG. 2.

Upstream ends of the four branch passage portions 36A-36D are connected with the bottom plate 35A of the chamber portion 35. As shown in FIG. 4, parts of the bottom plate 35A corresponding to the first to fourth branch passage portions 36A-36D are respectively provided with first to fourth openings 41A-41D, which are through-holes. The intake chamber 30 and the first to fourth branch passages 31A-31D are in communication with each other via the first to fourth openings 41A-41D, respectively. The first to fourth openings 41A-41D constitute the upstream ends of the first to fourth branch passages 31A-31D, respectively. The first to fourth openings 41A-41D are each formed in a circular shape and have the same radius.

In the bottom plate 35A, the first to fourth openings 41A-41D are arranged around a center line X. The first to fourth openings 41A-41D are arranged at equal intervals in an order of the first opening 41A, the third opening 41C, the fourth opening 41D, and the second opening 41B in the direction of rotation about the center line X perpendicular to the bottom plate 35A (clockwise direction (right-handed rotational direction) with reference to FIG. 4). This order of the openings 41A-41D is the same as the order of ignition of the cylinders 3A-3D. In other words, the openings 41A-41D are arranged in the direction of rotation about the center line X such that the corresponding cylinders 3A-3D are in accordance with the order of ignition.

In this embodiment, the center line X is positioned so as to coincide with the perpendicular line of the rectangular pyramid of the chamber portion 35. Further, the introduction passage 32 is disposed such that the axis thereof coincides with the center line X. In another embodiment, the center line X may not coincide with the perpendicular line of the rectangular pyramid of the chamber portion 35, and the axis of the introduction passage 32 may not coincide with the center line X.

The center line X is positioned on a virtual plane perpendicular to the cylinder row direction to pass through a part between the second and third cylinders 3B, 3C. Further, the center line X is positioned to be substantially parallel with the direction of extension of the outer end portion each intake port 6A-6D. The bottom plate 35A is disposed to be perpendicular to the direction of extension of the outer end portion of each intake port 6A-6D. The chamber portion 35 is disposed such that a pair of diagonally positioned corners of the bottom plate 35A are arranged in the cylinder row direction about the center line X. When a direction perpendicular to the cylinder row direction and the center line X is referred to as a first direction (up-down direction), the remaining pair of corners are disposed in the first direction about the center line X.

The first to fourth openings 41A-41D are located in the respective corners of the bottom plate 35A formed in the rectangular shape. The first opening 41A is located in the corner of the bottom plate 35A disposed on the first cylinder 3A side with respect to the center line X in the cylinder row direction. The second opening 41B is located in the corner of the bottom plate 35A disposed above the center line X in the first direction. The third opening 41C is located in the corner of the bottom plate 35A disposed below the center line X in the first direction. The fourth opening 41D is located in the corner of the bottom plate 35A disposed on the fourth cylinder 3D side with respect to the center line X in the cylinder row direction.

The first branch passage portion 36A extends from the first opening 41A obliquely outward in the cylinder row direction relative to the center line X (away from the center line X on the first cylinder 3A side). The fourth branch passage portion 36D extends from the fourth opening 41D obliquely outward in the cylinder row direction relative to the center line X (away from the center line X on the fourth cylinder 3D side). The first branch passage portion 36A and the fourth branch passage portion 36D are formed to be symmetric to each other with respect to a virtual plane perpendicular to the cylinder row direction and containing the center line X.

The second branch passage portion 36B extends from the second opening 41B in parallel with the center line X, and then extends obliquely toward the center line X in the first direction and outward in the cylinder row direction (away from the center line X on the first cylinder 3A side). The downstream end of the second branch passage portion 36B is located on the inner side of the downstream end of the first branch passage portion 36A in the cylinder row direction (on the side closer to the center line X). The third branch passage portion 36C extends from the third opening 41C in parallel with the center line X, and then extends obliquely toward the center line X in the first direction and outward in the cylinder row direction (away from the center line X on the fourth cylinder 3D side). The downstream end of the third branch passage portion 36C is located on the inner side of the downstream end of the fourth branch passage portion 36D in the cylinder row direction (on the side closer to the center line X).

The downstream ends of the first to fourth branch passage portions 36A-36D are arranged in line in the cylinder row direction, and each open out in the direction parallel with the center line X. The downstream ends of the first to fourth branch passage portions 36A-36D are arranged along the cylinder row direction in an order of the first branch passage portion 36A, the second branch passage portion 36B, the third branch passage portion 36C, and the fourth branch passage portion 36D. The downstream ends of the first to fourth branch passage portions 36A-36D are connected with each other by a single downstream-side flange 43.

The first to fourth branch passages 31A-31D are formed inside the first to fourth branch passage portions 36A-36D along the branch passage portions 36A-36D, respectively. The transverse cross sections of the first to fourth branch passages 31A-31D are each formed to be circular such that they have the same radius. The first to fourth branch passages 31A-31D are formed to have the same length and volume.

The downstream-side flange 43 is joined to a side face of the engine body 2. Thereby, the downstream end of the first branch passage 31A is connected to the first intake port 6A, the downstream end of the second branch passage 31B to the second intake port 6B, the downstream end of the third branch passage 31C to the third intake port 6C, and the downstream end of the fourth branch passage 31D to the fourth intake port 6D.

Figure 6:
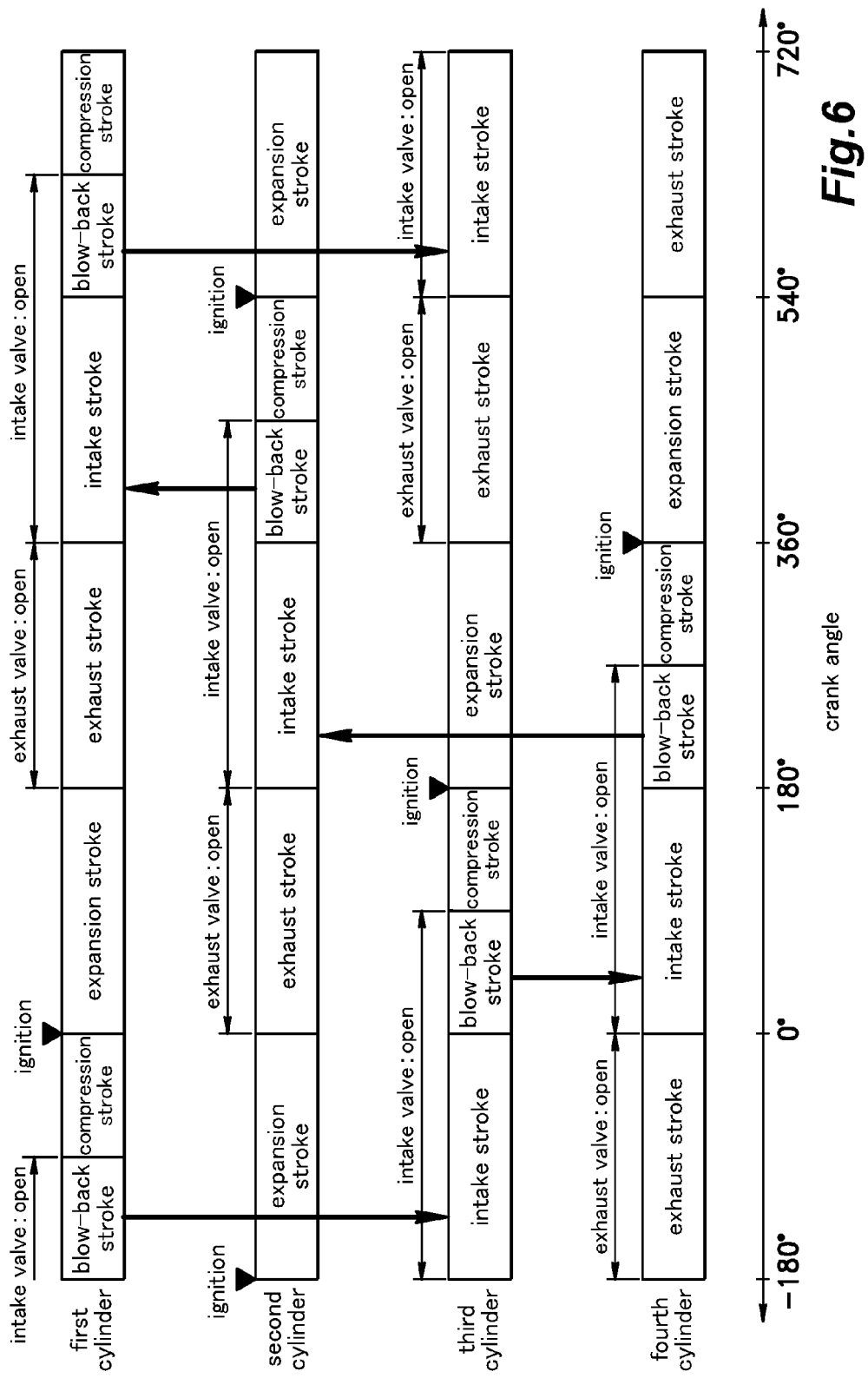
FIG. 6 is an explanatory diagram showing the combustion cycle of the internal combustion engine of the first embodiment.

As shown in FIG. 6, each of the first to fourth cylinders 3A-3D of the internal combustion engine 1 goes through the intake stroke, blow-back stroke, compression stroke, expansion stroke, and exhaust stroke in order while the crankshaft makes two revolutions (720 degrees revolution) according to the Atkinson cycle (Miller cycle). It is to be noted that the blow-back stroke may be considered a part of the intake stroke. In each cylinder 3, by opening the intake valve 11 and closing the exhaust valve 12 while the piston moves downward, air-fuel mixture is taken in through the intake port 6 (intake stroke). Subsequently, when the piston moves upward from the bottom dead center while the intake valve 11 is retained open and the exhaust valve 12 is retained closed, a part of the air-fuel mixture taken in the cylinder 3 is blown back to the intake port 6 (blow-back stroke). Then, the intake valve 11 is closed, so that as the piston moves upward, the air-fuel mixture in the cylinder 3 is compressed (compression stroke). Thereafter, when the piston is near the top dead center, the air-fuel mixture is combusted by spark ignition using the ignition device or by autoignition, and the piston is moved downward due to the generation of the burned gas (exhaust gas) (expansion stroke). Subsequently, the exhaust valve is opened when the piston reaches near the bottom dead center, such that the exhaust gas in the cylinder 3 is discharged through the exhaust port 7 by the upward movement of the piston thereafter (exhaust stroke). Thus, owing to the provision of the blow-back stroke, an Atkinson cycle is realized in that the compression stroke is shortened relative to the expansion stroke such that the expansion ratio becomes large relative to the compression ratio.

The pistons of the first and fourth cylinders 3A, 3D are at the top dead center when the crank angle is 0 degree or 360 degrees, while the pistons of the second and third cylinders 3C are at the top dead center when the crank angle is 180 degrees or 540 degrees. The order of ignition is the first cylinder 3A, the third cylinder 3C, the fourth cylinder 3D, and the second cylinder 3B, where, relative to the first cylinder 3A, the phase is delayed by 180 degrees in the third cylinder 3C, by 360 degrees in the fourth cylinder 3D, and by 540 degrees in the fourth cylinder 3D.

From the above relationship, as shown in FIG. 6, when the first cylinder 3A is in the intake stroke, the second cylinder 3B is in the blow-back stroke, when the third cylinder 3C is in the intake stroke, the first cylinder 3A is in the blow-back stroke, when the fourth cylinder 3D is in the intake stroke, the third cylinder 3C is in the blow-back stroke, and when the second cylinder 3B is in the intake stroke, the fourth cylinder 3D is in the blow-back stroke. Thus, when the intake stroke and the blow-back stroke overlap, the part of the air-fuel mixture blown back from the cylinder 3 in the blow-back stroke is returned to the intake chamber 30 through the intake port 6 and the branch passage 31, and is taken in the cylinder 3 in the intake stroke.

In the following, the effects of the intake device 23 according to the present embodiment will be described. In the intake device 23, the first to fourth openings 41A-41D constituting the connecting portions of the first to fourth branch passages 31A-31D with the intake chamber 30 are arranged in a direction of rotation about the center line X in the same order as the order of ignition of the first to fourth cylinders 3A-3D. Owing to this arrangement, the opening 41 corresponding to the cylinder 3 in the intake stroke and the opening 41 corresponding to the cylinder 3 in the blow-back stroke are always adjacent to each other in the direction of rotation about the center line X. Thereby, irrespective of which cylinder 3 is in the intake stroke, the distance between the opening 41 corresponding to the cylinder 3 in the intake stroke and the opening 41 corresponding to the cylinder 3 in the blow-back stroke is maintained substantially constant. Therefore, the influence that the cylinder 3 in the intake stroke may receive from the blow-back is equal for each cylinder 3A-3D, and the difference between the air-fuel ratios for the respective cylinders 3A-3D is reduced.

In this embodiment, the first to fourth intake ports 6A-6D are configured to have the same length and volume, and the first to fourth branch passages 31A-31D are configured to have the same length and volume, whereby the distances and volumes from the first to fourth cylinders 3A-3D to the intake chamber 30, via the intake ports 6A-6D and the branch passages 31A-31D, respectively, are equal to each other. Thereby, irrespective of which cylinder 3 is in the intake stroke, the distance and volume between the cylinder 3 in the intake stroke and the cylinder 3 in the blow-back stroke, via the intake port 6, branch passage 31, intake chamber 30, branch passage 31, and intake port 6, becomes constant. Therefore, the influence that the cylinder 3 in the intake stroke receives from the blow-back is equal for each cylinder 3A-3D, and the difference between the air-fuel ratios for the respective cylinders 3A-3D is reduced.

Figure 7:
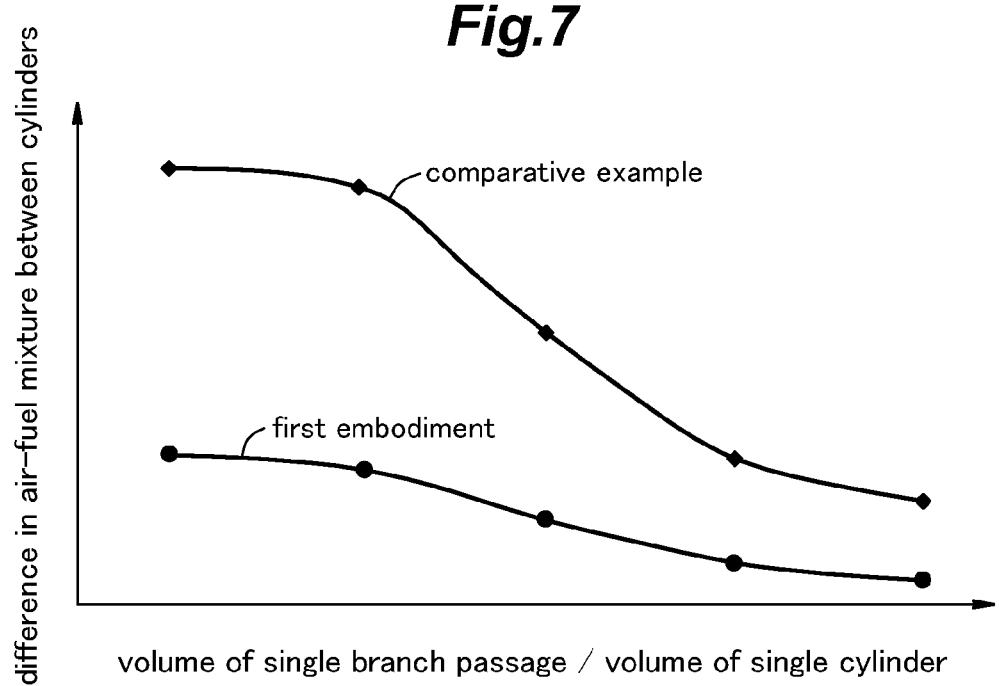
FIG. 7 is a graph showing a difference between the air-fuel ratios for the respective cylinders in the intake device of the first embodiment.

FIG. 7 is a diagram showing a difference between the air-fuel ratios for the respective cylinders 3A-3D in the intake device 23 of the first embodiment in comparison to the difference between the air-fuel ratios in the intake device of a comparative example. Here, the difference between the air-fuel ratios for the respective cylinders 3A-3D is a difference between the air-fuel ratio of one of the four cylinders 3A-3D having the largest air-fuel ratio and the air-fuel ratio of another having the smallest air-fuel ratio. The intake device of the comparative example differs from the intake device 23 of the first embodiment only with respect to the positions where the upstream ends of the branch passages are connected with the intake chamber, and the other configuration is the same. In the intake device of the comparative example, the upstream end of the first branch passage is connected to the position corresponding to the first opening 41A of the intake device 23 of the first embodiment, the upstream end of the second branch passage is connected to the position corresponding to the second opening 41B of the intake device 23 of the first embodiment, the upstream end of the third branch passage is connected to the position corresponding to the fourth opening 41D of the intake device 23 of the first embodiment, and the upstream end of the fourth branch passage is connected to the third opening 41C of the intake device 23 of the first embodiment. Namely, in the intake device of the comparative example, the upstream ends of the branch passages are not arranged, in the direction of rotation about the center line X, in the same order as the order of ignition of the cylinders 3 (first, third, fourth, second), but is arranged in the same order as the order of arrangement of the cylinders 3 (first, second, third, fourth). It is to be noted that, in the intake device of the comparative example, the lengths of the branch passages are set to be equal to each other. Further, the internal combustion engine 1 in which the intake device of the comparative example is used is configured such that the order of ignition is the first cylinder 3A, the third cylinder 3C, the fourth cylinder 3D, and the second cylinder 3B.

In the intake device of the comparative example, when the cylinder 3 in the intake stroke is switched, the distance between the upstream end of the branch passage 31 corresponding to the cylinder 3 in the intake stroke and the upstream end of the branch passage 31 corresponding to the cylinder 3 in the blow-back stroke changes. For example, when the first cylinder 3A is in the intake stroke, the second cylinder 3B is in the blow-back stroke, and the upstream end of the first branch passage 31A and the upstream end of the second branch passage 31B are adjacent to each other in the direction of rotation about the center line X. On the other hand, when the third cylinder 3C is in the intake stroke, the first cylinder 3A is in the blow-back stroke, and the upstream end of the first branch passage 31A and the upstream end of the third branch passage 31C are not adjacent to each other in the direction of rotation about the center line X. Therefore, the distance between the cylinder 3 in the intake stroke and the cylinder 3 in the blow-back stroke, via the intake port 6, branch passage, intake chamber 30, branch passage, and intake port 6, changes when the cylinder 3 in the intake stroke is switched.

In the intake device 23 of the present embodiment, irrespective of which cylinder 3 is in the intake stroke, the distance between the cylinder 3 in the intake stroke and the cylinder 3 in the blow-back stroke, via the intake port 6, branch passage 31, intake chamber 30, branch passage 31, and intake port 6, is constant, and therefore, as shown in FIG. 7, the difference between the air-fuel ratios for the respective cylinders 3A-3D is reduced as compared to the intake device of the comparative example. It is to be noted that, in the intake device of the comparative example also, it is possible to reduce the difference between the air-fuel ratios for the respective cylinders 3A-3D by increasing the volume (length) of each branch passage (increasing the volume of a single branch passage relative to the volume of a single cylinder). This phenomenon is due to that the increase in the length of the branch passage makes it less easy for the blown-back air-fuel mixture to reach the cylinder 3 in the intake stroke. As shown in FIG. 7, in the intake device 23 of the present embodiment, it is possible to reduce the difference between the air-fuel ratios for the respective cylinders 3A-3D branch passage 31 without increasing the volume (length), and thus, the intake device 23 can be made compact. Further, in the intake device 23 of the present embodiment, because the volume (length) of each branch passage 31 can be reduced, the time period from an operation of the throttle valve 18 or the turbocharger 20 until an effect thereof appears as a change in the air intake quantity can be shortened.

Next, description will be made of second to sixth embodiments in which the intake device 23 of the first embodiment is partially modified.

In the intake device 23 of the first embodiment described above, the upstream end of each branch passage 31 is offset (displaced) relative to the downstream end inward (toward the center line X) in the cylinder row direction. As a result, a blow-back flow passing through a given transverse cross section of each branch passage 31 has a higher velocity (density) on an outer side in the cylinder row direction and a lower velocity (density) on an inner side. Namely, the blow-back flow passing through a given transverse cross section of each branch passage 31 has a velocity difference (density difference) in the cylinder row direction due to the shape of the branch passage 31. Because the amount of offset of the upstream ends of the first and fourth branch passages 31A, 31D relative to the downstream ends thereof inward in the cylinder row direction (length of each branch passage 31A, 31D in the cylinder row direction) is larger than the amount of offset of the upstream ends of the second and third branch passages 31B, 31C relative to the downstream ends thereof toward the center in the cylinder row direction, the velocity difference (density difference) of the blow-back flow in the cylinder row direction becomes larger in the first and fourth branch passages 31A, 31D than in the second and third branch passages 31B, 31C. In a case where this velocity difference is large, the distance as the blow-back flow flows from the second or third opening 41B, 41C to the first or fourth opening 41A, 41D becomes longer than the distance as the blow-back flow flows from the first or fourth opening 41A, 41D to the second or third opening 41B, 41C, and it becomes difficult for the blow-back flow to flow. Specifically, the flow from the first opening 41A to the third opening 41C and the flow from the fourth opening 41D to the second opening 41B become more difficult to flow than the flow from the third opening 41C to the fourth opening 41D and the flow from the second opening 41B to the first opening 41A.

An object of the intake devices 200, 300, 400, 500 regarding the second to fifth embodiments is, by modifying a part of the intake device 23 of the first embodiment, to reduce the difference between the air-fuel ratios for the respective cylinders 3A-3D due to the aforementioned velocity difference of the blow-back flow in the cylinder row direction in the branch passages 31. In the following description of the second to fifth embodiments, the structures similar to those of the first embodiment will be denoted by the same reference numerals and the description thereof will be omitted, and only the structures that differ will be described.

Figure 8:
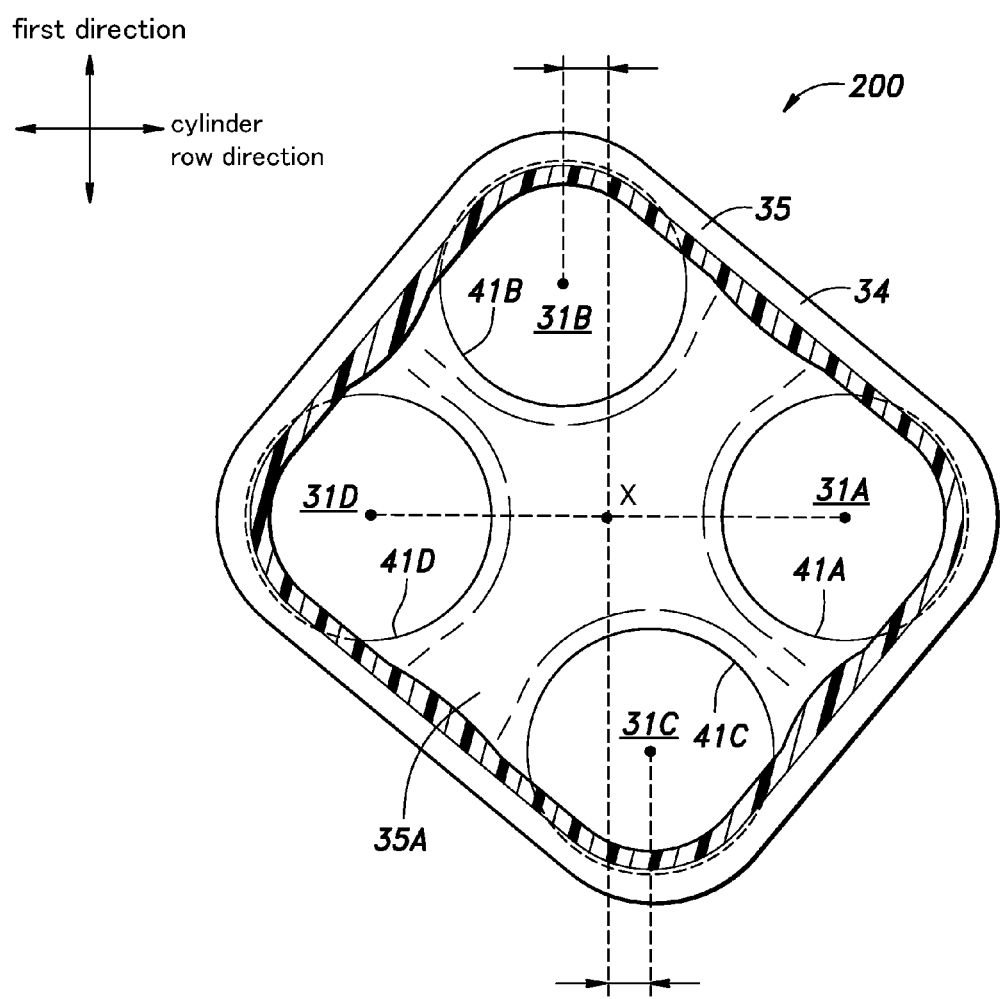
FIG. 8 is a cross-sectional view of an intake device according to a second embodiment.

As shown in FIG. 8, in comparison to the intake device 23 of the first embodiment, in the intake device 200 of second embodiment, the second opening 41B is offset relative to the center line X in the cylinder row direction toward the fourth opening 41D, and the third opening 41C is offset relative to the center line X in the cylinder row direction toward the first opening 41A. Thereby, the distance between the first opening 41A and the third opening 41C is smaller than the distance between the first opening 41A and the second opening 41B, and the distance between the second opening 41B and the fourth opening 41D is smaller than the distance between the third opening 41C and the fourth opening 41D. Further, in this embodiment, the distance between the first opening 41A and the third opening 41C and the distance between the second opening 41B and the fourth opening 41D are set to be equal to each other, and the distance between the first opening 41A and the second opening 41B and the distance between the third opening 41C and the fourth opening 41D are set to be equal to each other. In this embodiment, the bottom plate 35A is rectangular in shape, and the first opening 41A and the second opening 41B are arranged along one of the longer sides while the third opening 41C and the fourth opening 41D are arranged along the other of the longer sides.

In the intake device 200 of second embodiment, in comparison to the intake device 23 of the first embodiment, the flow from the first opening 41A to the third opening 41C and the flow from the fourth opening 41D to the second opening 41B are facilitated, and the flow from the third opening 41C to the fourth opening 41D and the flow from the second opening 41B to the first opening 41A are suppressed. Thereby, it is possible to further reduce the difference between the air-fuel ratios for the respective cylinders 3A-3D that occurs in the intake device 23 of the first embodiment.

Figure 9:
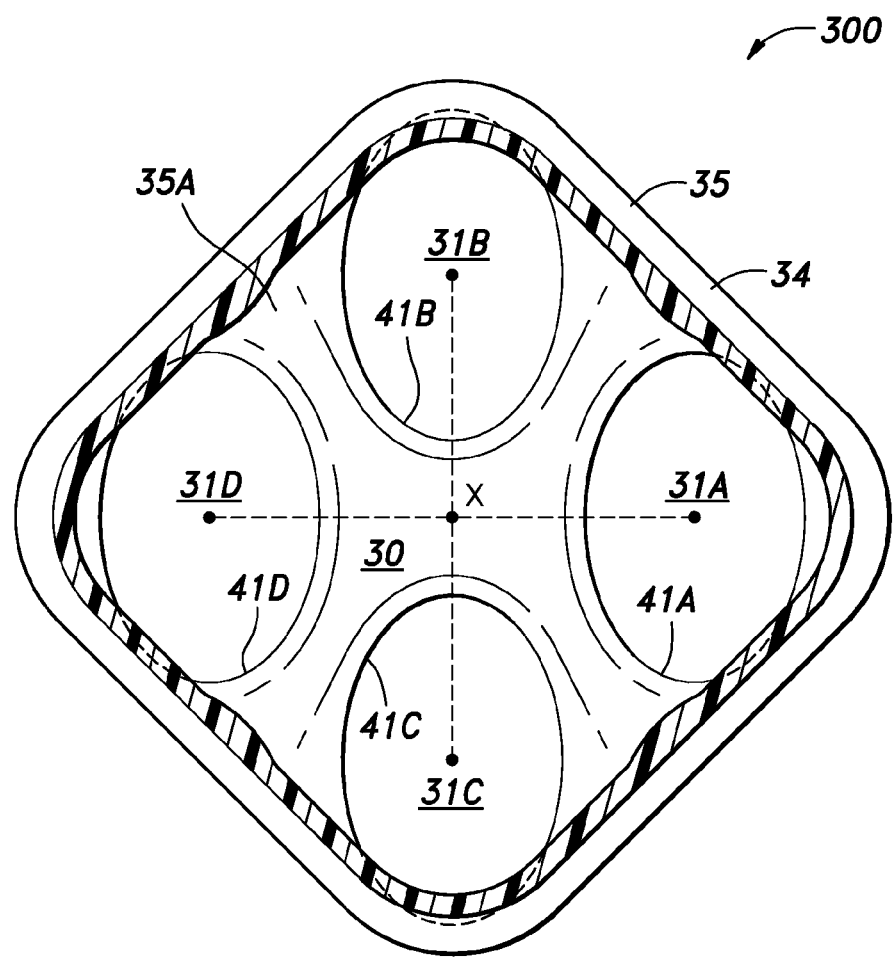
FIG. 9 is a cross-sectional view of an intake device according to a third embodiment.

As shown in FIG. 9, in the intake device 300 of the third embodiment, the first to fourth branch passages 31A-31D and the first to fourth openings 41A-41D are configured to have a transverse cross section in an elliptic shape having a length in the first direction larger than a length in the cylinder row direction.

In the intake device 300 of the third embodiment, in comparison to the intake device 23 of the first embodiment, the transverse cross section of each of the first to fourth branch passages 31A-31D and the first to fourth openings 41A-41D has a reduced width in the cylinder row direction, and as a result, the velocity difference (density difference) of the blow-back flow in the cylinder row direction in the first to fourth openings 41A-41D is reduced. Thereby, the difference between the distance as the blow-back flow flows from the second or third opening 41B, 41C to the first or fourth opening 41A, 41D and the distance as the flow-back flow flows from the first or fourth opening 41A, 41D to the second or third opening 41B, 41C is reduced. Therefore, in the intake device 300 of the third embodiment, it is possible to further reduce the difference between the air-fuel ratios for the respective cylinders that occurs in the intake device 23 of the first embodiment.

Figure 10A:
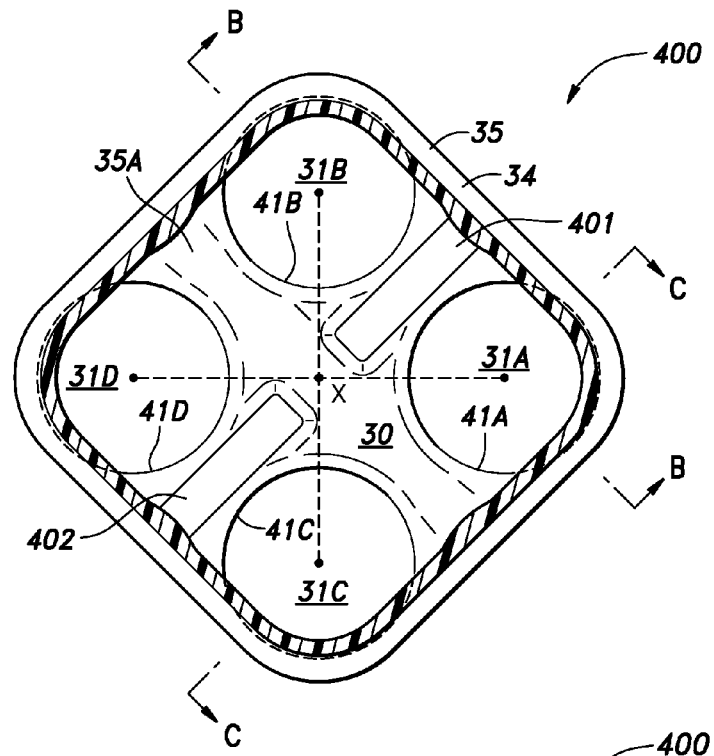
FIG. 10A is a cross-sectional view of an intake device according to a fourth embodiment.
Figure 10B:
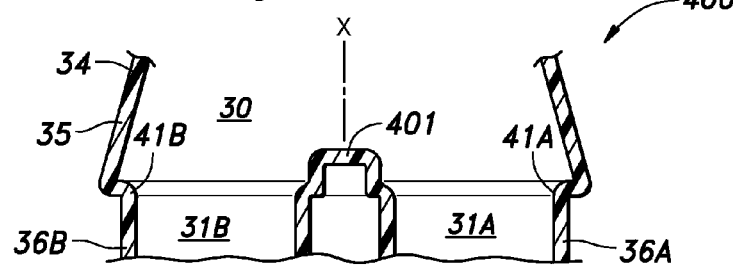
FIG. 10B is a cross-sectional view taken along line B-B in FIG. 10A.
Figure 10C:
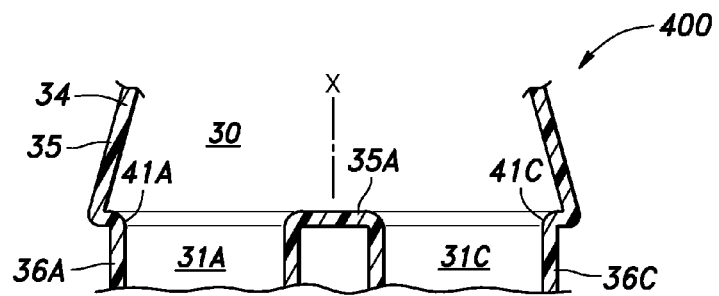
FIG. 10C is a cross-sectional view taken along line C-C in FIG. 10A.

As shown in FIGS. 10A-10C, in the intake device 400 of the fourth embodiment, a first barrier 401 is provided to protrude from a part of the inner surface of the bottom plate 35A (surface on the intake chamber 30 side) between the first opening 41A and the second opening 41B, and a second barrier 402 is provided to protrude from a part of the same between the third opening 41C and the fourth opening 41D. The first barrier 401 extends from a peripheral part of the bottom plate 35A toward the center line X to demarcate the part where the first opening 41A is formed and the part where the second opening 41B is formed from each other. Similarly, the second barrier 402 extends from a peripheral part of the bottom plate 35A toward the center line X to demarcate the part where the third opening 41C is formed and the part where the fourth opening 41D is formed from each other.

In the intake device 400 of the fourth embodiment, in comparison to the intake device 23 of the first embodiment, the blow-back flow from the second opening 41B to the first opening 41A is suppressed by the first barrier 401, and the blow-back flow from the third opening 41C to the fourth opening 41D is suppressed by the second barrier 402. Therefore, in the intake device 400 of the fourth embodiment, it is possible to further reduce the difference between the air-fuel ratios for the respective cylinders 3A-3D that occurs in the intake device 23 of the first embodiment.

Figure 11A:
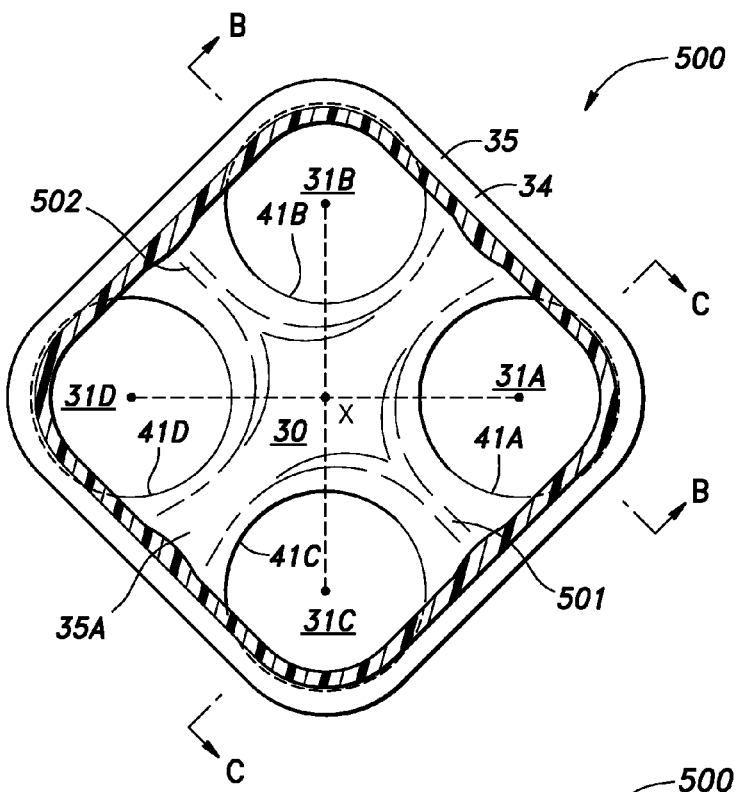
FIG. 11A is a cross-sectional view of an intake device according to a fifth embodiment.
Figure 11B:
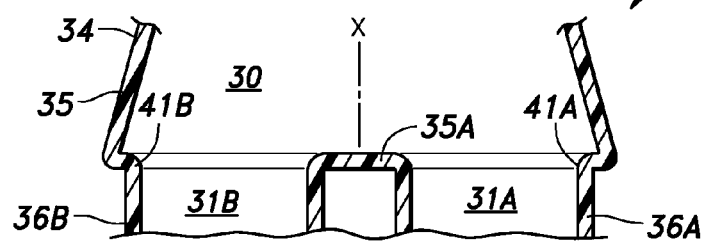
FIG. 11B is a cross-sectional view taken along line B-B in FIG. 11A.
Figure 11C:
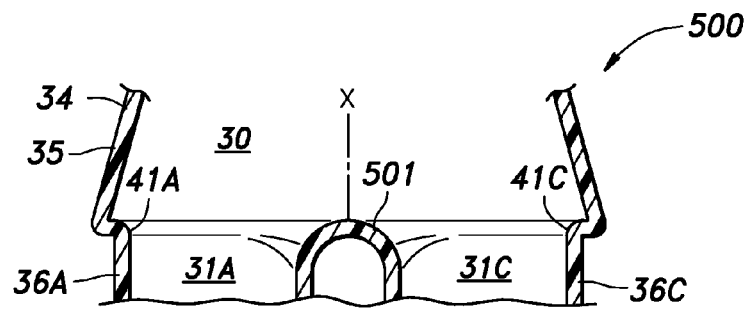
FIG. 11C is a cross-sectional view taken along line C-C in FIG. 11A.

As shown in FIGS. 11A-11C, in the intake device 500 of the fifth embodiment, a first curved surface portion 501 is formed in a part of the inner surface of the bottom plate 35A (surface on the intake chamber 30 side) between the first opening 41A and the third opening 41C, and a second curved surface portion 502 is formed in a part of the same between the third opening 41C and the fourth opening 41D. The first curved surface portion 501 is formed to smoothly connect an edge of the first opening 41A and an edge of the third opening 41C. In other words, the first curved surface portion 501 bevels the corner formed by the inner surface of the bottom plate 35A and the inner surface of the first branch passage portion 36A (edge of the first opening 41A) and the corner formed by the inner surface of the bottom plate 35A and the inner surface of the second branch passage portion 36B (edge of the second opening 41B). Similarly, the second curved surface portion 502 is formed to smoothly connect an edge of the third opening 41C and an edge of the fourth opening 41D. The first and second curved surface portions 501, 502 are formed such that the cross section thereof has an arcuate (such as semicircular) outer profile.

In the intake device 500 of the fifth embodiment, in comparison to the intake device 23 of the first embodiment, the blow-back flow from the first opening 41A toward the third opening 41C is facilitated by the first curved surface portion 501, and the blow-back flow from the fourth opening 41D toward the second opening 41B is facilitated by the second curved surface portion 502. Therefore, in the intake device 500 of the fifth embodiment, it is possible to further reduce the difference between the air-fuel ratios for the respective cylinders 3A-3D that occurs in the intake device 23 of the first embodiment.

In the intake device 600 of the sixth embodiment, the arrangement of the first to fourth openings 41A-41D is different in comparison to the intake device 23 of the first embodiment. As shown in FIGS. 12A and 12B, in the intake device 600 of the sixth embodiment, the first opening 41A is located on the first cylinder 3A side with respect to the center line X in the cylinder row direction and above the center line X in the first direction. The second opening 41B is located on the fourth cylinder 3D side with respect to the center line X in the cylinder row direction and above the center line X in the first direction, such that the second opening 41B is located on the fourth cylinder 3D side of the first opening 41A in the cylinder row direction. The third opening 41C is located on the first cylinder 3A side with respect to the center line X in the cylinder row direction and below the center line X in the first direction, such that the third opening 41C is located below the first opening 41A in the first direction. The fourth opening 41D is located on the fourth cylinder 3D side with respect to the center line X in the cylinder row direction and below the center line X in the first direction, such that the fourth opening 41D is located on the fourth cylinder 3D side of the third opening 41C in the cylinder row direction.

In the intake device 600 of the sixth embodiment, the amount of offset of the second opening 41B and the third opening 41C relative to the center line X in the cylinder row direction is equal to the amount of offset of the first opening 41A and the fourth opening 41D relative to the center line X in the cylinder row direction. Therefore, in the intake device 600 of the sixth embodiment, in comparison to the intake device 23 of the first embodiment, the difference between the length of the second branch passage 31B and the third branch passage 31C in the cylinder row direction and the length of the first branch passage 31A and the fourth branch passage 31D in the cylinder row direction is reduced.

The intake device 700 of the seventh embodiment is modified from the intake device 23 of the first embodiment to improve the manufacturability thereof. In the intake device 23 of the first embodiment, the second branch passage portion 36B and the third branch passage portion 36C overlap each other in the first direction (vertical direction) to define a gap therebetween, and the first to fourth branch passage portions 36A-36D overlap each other in the cylinder row direction to define a gap between adjacent ones of the branch passage portions 36A-36D. Therefore, the outer shape of the intake device 23 cannot be formed by molding using a two-piece die. The intake device 700 of the seventh embodiment is modified from the intake device 23 such that the outer shape can be formed by molding using a two-piece die.

Figure 13:
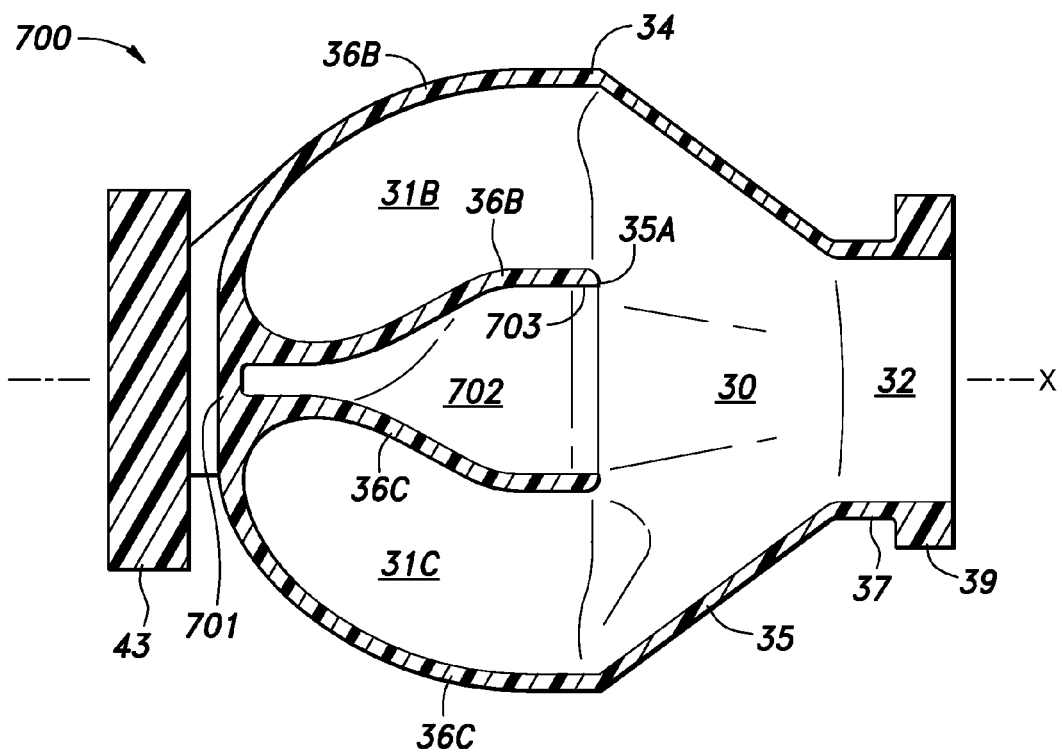
FIG. 13 is a cross-sectional view of an intake device according to a seventh embodiment.

As shown in FIG. 13, in the intake device 700 of the seventh embodiment, the outer surfaces of the first to fourth branch passage portions 36A-36D and the outer surface of the chamber portion 35 are connected with each other by a connecting wall 701. The outer surfaces of the first to fourth branch passage portions 36A-36D, the outer surface of the chamber portion 35, and the connecting wall 701 jointly form an inner chamber 702 closed to the exterior of the intake device 700. The inner chamber 702 is in communication with the intake chamber 30 via a through-hole 703 formed at a central part of the bottom plate 35A. With this configuration, the outer shape of the intake device 23 can be formed easily by molding; for example, can be formed by molding using a two-piece die. The inner chamber 702 communicates with the intake chamber 30 at one end but is closed at the other part, and therefore, there is little intake air flowing from the intake chamber 30 to the inner chamber 702. Thus, the inner chamber 702 does not affect the intake air flowing to the respective branch passages 31.

The concrete embodiments have been described in the foregoing, but the present invention may be carried out with a variety of modifications without being limited to the foregoing embodiments. In the foregoing embodiments, examples of the intake devices 23, 200, 300, 400, 500, 600 adapted for the internal combustion engine 1 having four cylinders were described, but the intake devices 23, 200, 300, 400, 500, 600 may be adopted to an internal combustion engine 1 having three cylinders or more.

Also, the characteristic structures of the intake devices 23, 200, 300, 400, 500 of the first to fifth embodiments described above may be combined with each other. The intake device 23 may include at least two of: the structure relating to the second embodiment in that the second and third openings 41C are offset relative to the center line X in the cylinder row direction; the structure relating to the third embodiment in that the transverse cross sections of the branch passages 31 and the openings 41 are formed to be elliptic; the structure relating to the fourth embodiment in that first and second barriers 401, 402 are provided; and the structure relating to the fifth embodiment in that the first and second curved surface portions 501, 502 are provided.

In the foregoing embodiments, description was made with regard to the case where the order of ignition of the cylinders 3 is first, third, fourth, and second, but the order of ignition may be first, second, fourth, and third. In this case also, similarly to the foregoing embodiments, the upstream ends of the first to fourth branch passages 31A-31D (first to fourth openings 41A-41D) are arranged in the direction of rotation about the center line X in the same order as the order of ignition of the first to fourth cylinders 3A-3D, and exhibit similar effects.

It is to be noted that the shapes and arrangements of the branch passage portions 36A, 36B, 36C, 36D in the foregoing embodiments are mere examples, and the shapes and arrangements may not be limited to the described examples. For example, in the first embodiment, the second branch passage portion 36B and the third branch passage portion 36C include portions that extend from the second opening 41B and the third opening 41C, respectively, in parallel to the center line X, but this structure is not indispensable and may be replaced with another shape.

Further, the configuration of the intake system 15 is not limited to that shown in FIG. 1. For instance, an exhaust gas recirculation passage for recirculating the exhaust gas to the intake system 15 may be provided to the intake system 15. In this case, the exhaust gas recirculation passage may be provided to connect the exhaust manifold 25 with the intake chamber 30 of the intake device 23, for example. Also, a cooling device for cooling the exhaust gas to be recirculated to the intake device 23 may be provided. The intercooler 19 may be built in the intake device 23.

GLOSSARY

1 . . . internal combustion engine, 2 . . . engine body, 3A-3D . . . first to fourth cylinders, 6A-6D . . . first to fourth intake ports, 15 . . . intake system, 16 . . . air inlet, 23, 200, 300, 400, 500, 600, 700 . . . intake device, 30 . . . intake chamber, 31A-31D . . . first to fourth branch passages, 32 . . . introduction passage, 34 . . . housing, 35 . . . chamber portion, 35A . . . bottom plate, 36A-36D . . . first to fourth branch passage portions, 37 . . . introduction passage portion, 41A-41D . . . first to fourth openings, 401 . . . first barrier, 402 . . . second barrier, 501 . . . first curved surface portion, 502 . . . second curved surface portion, 701 . . . connecting wall, 702 . . . inner chamber, 703 . . . through-hole, X . . . center line

The invention claimed is:

1. An intake device for an internal combustion engine having first to fourth cylinders arranged along a predetermined cylinder row direction, the intake device comprising:
   an intake chamber formed in a shape of a rectangular pyramid having a rectangular bottom plate and configured to be connected at a top portion thereof to an air inlet; and
   a first to fourth branch passages connected at upstream ends thereof to the bottom plate of the intake chamber and connected at downstream ends thereof to intake ports communicating with the first to fourth cylinders, respectively,
   wherein:
      the upstream ends of the branch passages are arranged in a direction of rotation about a predetermined center line in a same order as an order of ignition of the cylinders;
      the order of ignition is first, third, fourth, and second cylinder or first, second, fourth, and third cylinder;
      the center line is positioned on a plane perpendicular to the cylinder row direction to pass through a part between the second and third cylinders;
      the bottom plate is disposed such that a pair of diagonally positioned corners thereof are arranged in the cylinder row direction about the center line, and a remaining pair of corners are arranged in a first direction that is perpendicular to the cylinder row direction and the center line;
      the upstream end of the first branch passage communicating with the first cylinder is located in a corner of the bottom plate disposed on a first cylinder side with respect to the center line in the cylinder row direction;
      the upstream end of the fourth branch passage communicating with the fourth cylinder is located in a corner of the bottom plate disposed on a fourth cylinder side with respect to the center line in the cylinder row direction;
      the upstream end of the second branch passage communicating with the second cylinder is located in a corner of the bottom plate disposed on one side with respect to the center line in the first direction;
      the upstream end of the third branch passage communicating with the third cylinder is located in a corner of the bottom plate disposed on the other side with respect to the center line in the first directions;
      each of the first branch passage and the fourth branch passage extends from the upstream end thereof to the downstream end thereof obliquely outward in the cylinder row direction relative to the center line;
      each of the second branch passage and the third branch passage extends from the upstream end thereof to the downstream end thereof obliquely toward the center line in the first direction and outward in the cylinder row direction relative to the center line.

2. The intake device according to claim 1, wherein the first branch passage and the fourth branch passage are formed to be symmetric to each other with respect to a virtual plane perpendicular to the cylinder row direction and containing the center line, and extend from the bottom plate obliquely outward in the cylinder row direction relative to the center line.

3. The intake device according to claim 2, wherein the upstream ends of the branch passages corresponding to the first and fourth cylinders are formed to have a transverse cross section in an elliptic shape having a length in the first direction larger than a length in the cylinder row direction.

4. The intake device according to claim 2, wherein the upstream end of the branch passage corresponding to the second cylinder is offset relative to the center line in the cylinder row direction toward the branch passage corresponding to the cylinder in which ignition is performed immediately before ignition in the second cylinder, and
   the upstream end of the branch passage corresponding to the third cylinder is offset relative to the center line in the cylinder row direction toward the branch passage corresponding to the cylinder in which ignition is performed immediately before ignition in the third cylinder.

5. The intake device according to claim 2, wherein a first barrier for suppressing a flow of gas is provided to protrude from a part of an inner surface of a housing forming the intake chamber between the upstream end of the branch passage corresponding to the first cylinder and the upstream end of the branch passage corresponding to the cylinder in which ignition is performed immediately before ignition in the first cylinder, and
   a second barrier for suppressing a flow of gas is provided to protrude from a part of the inner surface of the housing forming the intake chamber between the upstream end of the branch passage corresponding to the fourth cylinder and the upstream end of the branch passage corresponding to the cylinder in which ignition is performed immediately before ignition in the fourth cylinder.

6. The intake device according to claim 5, wherein each of the first barrier and the second barrier extends from a peripheral part of the inner surface of the rectangular bottom plate toward the center line.

7. The intake device according to claim 2, wherein a part of an inner surface of a housing forming the intake chamber between the upstream end of the branch passage corresponding to the first cylinder and the upstream end of the branch passage corresponding to the cylinder in which ignition is performed immediately before ignition in the first cylinder is provided with a first curved surface portion that is smooth to facilitate a flow of gas, and a part of the inner surface of the housing forming the intake chamber between the upstream end of the branch passage corresponding to the fourth cylinder and the upstream end of the branch passage corresponding to the cylinder in which ignition is performed immediately before ignition in the fourth cylinder is provided with a second curved surface portion that is smooth to facilitate a flow of gas.

8. The intake device according to claim 1, wherein a total length of the branch passage and intake port is set to be equal for each of the cylinders.

9. The intake device according to claim 8, wherein lengths of the branch passages are set to be equal to each other.

10. The intake device according to claim 1, comprising:
a chamber forming member forming the intake chamber;
a plurality of passage forming members forming the branch passages, respectively; and
a connecting wall connecting an outer surface of the chamber forming member and outer surfaces of the passage forming members to each other such that a space defined between the outer surfaces of the chamber forming member and the passage forming members constitutes an inner chamber closed to an outside,
wherein the inner chamber is in communication with the intake chamber.

11. The intake device according to claim 1, wherein the center line passes centrally through a downstream-side flange connecting the downstream ends of the branch passages to each other and joined to a side face of an engine body.

12. The intake device according to claim 1, wherein the amount of offset of the upstream ends of the first and fourth branch passages relative to the downstream ends thereof inward in the cylinder row direction is larger than the amount of offset of the upstream ends of the second and third branch passages relative to the downstream ends thereof inward in the cylinder row direction.

13. The intake device according to claim 1, wherein the center line is positioned so as to coincide with the perpendicular line of the rectangular pyramid of the intake chamber.

14. The intake device according to claim 1, comprising an introduction passage connected to the top portion of the intake chamber, and disposed such that the axis thereof coincides with the center line.

15. An intake device for an internal combustion engine having first to fourth cylinders arranged along a predetermined cylinder row direction, the intake device comprising:
an intake chamber formed in a shape of a rectangular pyramid having a rectangular bottom plate and configured to be connected at a top portion thereof to an air inlet; and
a first to fourth branch passages connected at upstream ends thereof to the bottom plate of the intake chamber and connected at downstream ends thereof to intake ports communicating with the first to fourth cylinders, respectively,
wherein:
the upstream ends of the branch passages are arranged in a direction of rotation about a predetermined center line in a same order as an order of ignition of the cylinders;
the order of ignition is first, third, fourth, and second cylinder or first, second, fourth, and third cylinder;
the center line is positioned on a plane perpendicular to the cylinder row direction to pass through a part between the second and third cylinders;
the bottom plate is disposed such that a pair of diagonally positioned corners thereof are arranged in the cylinder row direction about the center line, and a remaining pair of corners are arranged in a first direction that is perpendicular to the cylinder row direction and the center line;
the upstream end of the first branch passage communicating with the first cylinder is located in a corner of the bottom plate disposed on a first cylinder side with respect to the center line in the cylinder row direction;
the upstream end of the fourth branch passage communicating with the fourth cylinder is located in a corner of the bottom plate disposed on a fourth cylinder side with respect to the center line in the cylinder row direction;
the upstream end of the second branch passage communicating with the second cylinder is located in a corner of the bottom plate disposed on one side with respect to the center line in the first direction;
the upstream end of the third branch passage communicating with the third cylinder is located in a corner of the bottom plate disposed on the other side with respect to the center line in the first direction;
the first branch passage and the fourth branch passage are formed to be symmetric to each other with respect to a virtual plane perpendicular to the cylinder row direction and containing the center line, and extend from the bottom plate obliquely outward in the cylinder row direction relative to the center line;
the upstream end of the branch passage corresponding to the second cylinder is offset relative to the center line in the cylinder row direction toward the branch passage corresponding to the cylinder in which ignition is performed immediately before ignition in the second cylinder; and
the upstream end of the branch passage corresponding to the third cylinder is offset relative to the center line in the cylinder row direction toward the branch passage corresponding to the cylinder in which ignition is performed immediately before ignition in the third cylinder.

16. An intake device for an internal combustion engine having first to fourth cylinders arranged along a predetermined cylinder row direction, the intake device comprising:
an intake chamber formed in a shape of a rectangular pyramid having a rectangular bottom plate and configured to be connected at a top portion thereof to an air inlet; and
a first to fourth branch passages connected at upstream ends thereof to the bottom plate of the intake chamber and connected at downstream ends thereof to intake ports communicating with the first to fourth cylinders, respectively,
wherein:
the upstream ends of the branch passages are arranged in a direction of rotation about a predetermined center line in a same order as an order of ignition of the cylinders;
the order of ignition is first, third, fourth, and second cylinder or first, second, fourth, and third cylinder;
the downstream ends of the first to fourth branch passages are arranged in line in the cylinder row direction;
the center line is positioned on a plane perpendicular to the cylinder row direction to pass through a part between the second and third cylinders, and passes through between the downstream ends of the second and third branch passages;

the bottom plate is disposed such that a pair of diagonally positioned corners thereof are arranged in the cylinder row direction about the center line, and a remaining pair of corners are arranged in a first direction that is perpendicular to the cylinder row direction and the center line;

the upstream end of the first branch passage communicating with the first cylinder is located in a corner of the bottom plate disposed on a first cylinder side with respect to the center line in the cylinder row direction;

the upstream end of the fourth branch passage communicating with the fourth cylinder is located in a corner of the bottom plate disposed on a fourth cylinder side with respect to the center line in the cylinder row direction;

the upstream end of the second branch passage communicating with the second cylinder is located in a corner of the bottom plate disposed on one side with respect to the center line in the first direction; and the upstream end of the third branch passage communicating with the third cylinder is located in a corner of the bottom plate disposed on the other side with respect to the center line in the first direction.

* * * * *